United States Patent [19]

deCiutiis et al.

[11] Patent Number: 5,668,955
[45] Date of Patent: Sep. 16, 1997

[54] CONTROLLER FOR ACCESSING SERVICES FROM MULTIPLE PROVIDERS OF SERVICES

[75] Inventors: Ernest deCiutiis, Peoria; William L. Martin, Mesa, both of Ariz.

[73] Assignee: Demar L.P., Mesa, Ariz.

[21] Appl. No.: 529,008

[22] Filed: Sep. 15, 1995

[51] Int. Cl.$^6$ .................. H04M 15/00; H04M 7/00; H04M 1/00; H04M 3/00
[52] U.S. Cl. .................. 379/130; 379/131; 379/140; 379/221; 379/355
[58] Field of Search .................. 375/114, 112, 375/121, 130, 131, 140; 379/221, 354, 355, 356

[56] References Cited

U.S. PATENT DOCUMENTS

| | | |
|---|---|---|
| 4,410,765 | 10/1983 | Hestad et al. . |
| 4,645,879 | 2/1987 | Simmons ................. 379/355 |
| 4,756,019 | 7/1988 | Szybicki . |
| 4,769,834 | 9/1988 | Billinger et al. . |
| 4,799,255 | 1/1989 | Billinger et al. . |
| 4,972,464 | 11/1990 | Webb et al. . |
| 5,420,914 | 5/1995 | Blumhardt ................. 379/131 |
| 5,425,085 | 6/1995 | Weinberger et al. ................. 379/130 |
| 5,473,630 | 12/1995 | Penzias et al. ................. 379/130 |
| 5,519,769 | 5/1996 | Weinberger et al. ................. 379/130 |

OTHER PUBLICATIONS

Flyer on "Series 2500 Dialers" Published by Metro Tel Corp., of Jericho, New York (date unknown).

*Primary Examiner*—Curtis Kuntz
*Assistant Examiner*—Paul Loomis
*Attorney, Agent, or Firm*—Lackenbach Siegel Marzullo Aronson & Greenspan, P.C.

[57] ABSTRACT

An access controller is placed in series with a subscriber's telephone set and includes an off hook detector, a ring detector, a central office simulator and DTMF circuitry which cooperate with a microcontroller or microprocessor suitably programmed to select one of a multiple providers of services by generating an access code corresponding to one of the service providers in accordance with an algorithm which provides a desired distribution of usage by the subscriber. The controller inserts a five digit prefix, namely the access code into the dialed number. The access code allows the call to be routed through a specific long distance service provider telephone network. By inserting the access code into the dialed number the device selects a particular long distance carrier for the duration of the call. Access codes are stored in a memory list of the access controller. Examples of algorithms used to select access codes from memory include a "rotating" algorithm for sequencing next access codes stored in memory in a predetermined order or sequence which are rotated one after the other. Another algorithm is a "time based" algorithm which employs a real time clock to establish preset time intervals during which each of the access codes are used. The controller can also use a "random selection" algorithm in which the controller selects an access code at random from those stored in a memory list. The controller is transparent to incoming calls and local outgoing calls, as well as certain excepted calls which commence with the digit "1". However, as soon as the controller detects an outgoing long distance call which commences with a digit "1", the controller inserts a prefix or access code to the dialed number to connect the subscriber's telephone unit with a long distance provider or carrier in accordance with the desired algorithm.

22 Claims, 13 Drawing Sheets

FIG.2B

| FIG.2B-1 | FIG.2B-2 |

CALL ORIGINATION

↓

CONNECT USERS PHONE TO ACCESS CONTROLLER:
  ENABLE +12V OUTPUT ON SWITCHING REGULATOR.
  CONNECT PHONE LINE TO ACCESS CONTROLLER(CLOSE SW2).
  DISCONNECT USERS PHONE FROM CENTRAL OFFICE(OPEN SW1).
  CONNECT USERS PHONE TO SYSTEM(CLOSE SW3).
  PASS DIAL TONE(CLOSE SW4).

↓

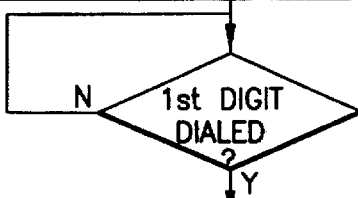
1st DIGIT DIALED ? — N (loop) / Y ↓

STORE DIGIT AND DISCONNECT DIAL TONE(OPEN SW4)

↓

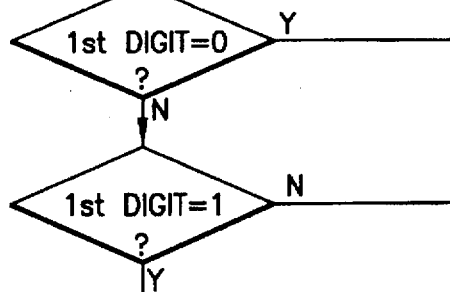
1st DIGIT=0 ? — Y →
  ↓ N
1st DIGIT=1 ? — N →
  ↓ Y

TRANSMIT ANY PREVIOUSLY STORED DIGIT

↓

RECONNECT USERS PHONE TO PHONE LINE:
  DISCONNECT PHONE FROM SYSTEM(OPEN SW3).
  CONNECT PHONE TO CENTRAL OFFICE(CLOSE SW1).
  DISCONNECT SYSTEM FROM CENTRAL OFFICE(OPEN SW2)
  DISABLE 12V OUTPUT FROM SWITCHING REGULATOR.

↓

PWR DOWN

FIG.2B-1

CONTROLLER FOR ACCESSING SERVICES FROM MULTIPLE PROVIDERS OF SERVICES

BACKGROUND OF THE INVENTION

1. Field of the Invention

This invention generally relates to controllers, and, more specifically, to a controller for accessing services from multiple providers of services.

2. Description of the Prior Art

With numerous services consumers have a choice in selecting the service that they wish to receive. Thus, for example, a viewer can switch between broadcast channels on a television set or cable channels on a cable system. However, there are numerous situations where a consumer is essentially tied to one service provider. This is true, for example, in connection with long distance telephone carriers, and the like. Thus, for example, consumers typically sign up with one long distance carrier and all of the long distance telephone calls are automatically placed by the local telephone company through the selected long distance telephone carrier. When a consumer decides to change from one carrier to another, the local telephone company frequently imposes a charge for changing the long distance carriers. However, by being tied to a specific long distance, the consumer has been required to incur whatever charges that long distance carrier was charging for long distance calls. While long distance carriers frequently spend a great effort and expense to attract new customers, once a customer has signed up with a long distance carrier, there is no incentive for the long distance company to lower their fees, to provide better services, etc, since the customer becomes a "captive" customer that the long distance company can, more or less, rely upon for continued patronage. In most instances, consumers tend to elect and stick with the larger long distance carriers, such as AT&T, Sprint, MCI, etc, names which are well known to them and that they are used to dealing with. However, these companies do not necessarily provide the lowest rates or the best services.

A number of devices have been proposed and have become available in the market place for allowing consumers to dial different long distances carriers. For example, Metro Tel of Jericho, N.Y. offers a dialer, Series 2500, which dials out sequences of numbers to access inter-exchange carriers of choice for long distance or toll calls. These dialers accept and store the network access code, authorization code and then redial the numbers at an appropriate timing sequence. The operation is transparent to the user and the user does not have to dial any extra digits. These dialers also provide least cost routing of long distance or toll calls, and up to ten different routes are available which can route by area codes and three digit prefixes to the carrier of choice. However, all of these functions pre-programmed into a memory unit an accessed at a pre-determined time via the customer's usage. The unit is, in essence, an automatic phone dialer that depends on a pre-programmed set of assignments.

In U.S. Pat. No. 4,972,464 a system is disclosed for placement of a long distance telephone carrier point-of-presence and call routing. The system determines the transport cost of long distance traffic to a long distance carrier and the lowest cost routing for long distance traffic within a local area of transport that is being accessed by customers and picking the carrier via a programmed computer. Such system is typically in a central office or toll switching center.

Numerous systems have been disclosed for routing calls. For example, U.S. Pat. No. 4,756,019 discloses a routing and automatic network management system for telecommunications networks. Telephone call routing and charging systems are known, as suggested in the U.S. Pat. No. 4,410,765. A programmable automatic calling system is disclosed in U.S. Pat. No. 4,468,529, in which a predetermined time interval is provided for the user for initiating operation of an automatic calling system for outputting access telephone number and billing code information. An inter-exchange carrier access system which uses automatic number identification (ANI) is disclosed in U.S. Pat. Nos. 4,769,834 and 4,799,255. Thus, elaborate routing circuits for use at telephone exchanges are known. Automatic dialers, per se, are also well known and commonly used. However, a telephone controller has not been proposed which automatically connects a caller to a long distance telephone carrier as a function of a pre-programmed algorithm which automatically inserts a suitable long distance prefix access code prior to dialing, in which the algorithm provides a desired distribution of usage of the service providers by the subscriber.

SUMMARY OF THE INVENTION

Accordingly, it is an object of the present invention to provide a controller for accessing services from multiple providers of services.

It is another object of the present invention to provide a controller for accessing service from one of a multiple number of service providers which is simple in construction and economical to manufacture.

It is still another object of the present invention to provide a controller of the type suggested in the previous objects which is convenient to use.

It is yet another object of the present invention to provide a controller of the type under discussion which becomes visible only when a subscriber makes an outgoing long distance telephone call and is otherwise transparent to the user and to the user's equipment.

It is a further object of the present invention to provide a controller as in the previous objects which can be used to access numerous services from multiple providers of services, including long distance telephone service, cable, financial services, etc.

It is still a further object of the present invention to provide a controller for accessing services from multiple providers of services which serves as an equalizer and provides a desired distribution of usage by a subscriber of a plurality of service providers.

It is yet a further object of the present invention to provide a controller as in the previous objects which can be used with pulse, tone and cellular telephone systems.

It is an additional object of the present invention to provide a method for accessing services from multiple providers of services as suggested in the previous objects.

In order to achieve the above objects, as well as others which will become apparent hereafter, a controller in accordance with the present invention for accessing a predetermined service by a subscriber of one of multiple providers of services each of which is identified and selectable by a unique access code, comprises means for monitoring a subscriber unit which serves to initiate the desired service. The controller includes means for detecting when the subscriber elects to obtain the predetermined service from one of the service providers of a plurality of service providers. Selection means is provided for selecting one of the multiple providers of the service by generating an access code corresponding to one of the service providers in accordance with a predetermined algorithm which provides a desired distribution of usage by the subscriber of a plurality of the service providers. In this manner, a subscriber will obtain said predetermined service from each of said plurality of service providers with continued use of the controller.

The method of the present invention includes the steps of monitoring a subscriber unit which serves to initiate the desired service, and detecting when the subscriber elects to obtain the predetermined service from one of the service providers. One of the multiple providers of services is then selected by generating an access code corresponding to one of the service providers in accordance with a predetermined algorithm which provides a desired distribution of usage by the subscriber of a plurality of the service providers.

BRIEF DESCRIPTION OF THE DRAWINGS

Other objects and advantages of the present invention will become apparent upon reading of the following detailed description of the preferred embodiment of the present invention when taken in conjunction with the drawings, as follows:

FIG. 5 is a block diagram, showing a simplified arrangement of functional components for the controller in accordance with the present invention, of which FIG. 1 is a more detailed representation.

DESCRIPTION OF A PREFERRED EMBODIMENT

Figure 4A:
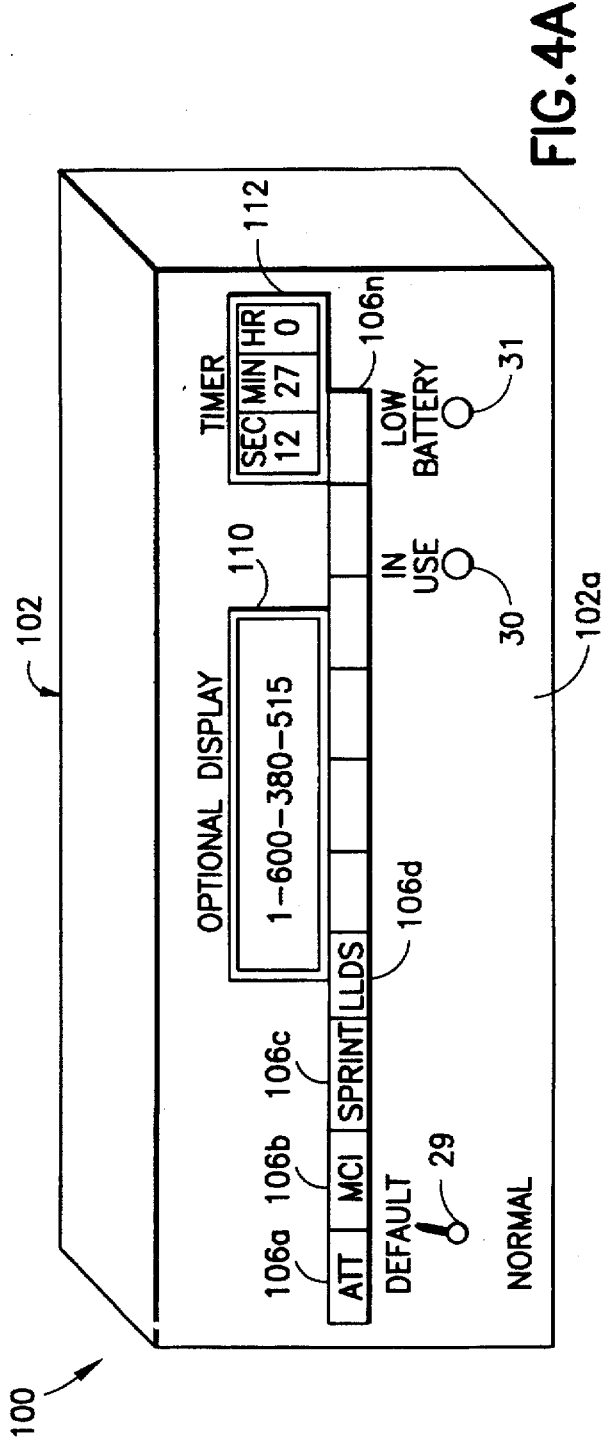
FIG. 4A is a perspective view of a housing for incorporating the controller of the present invention.
Figure 4B:
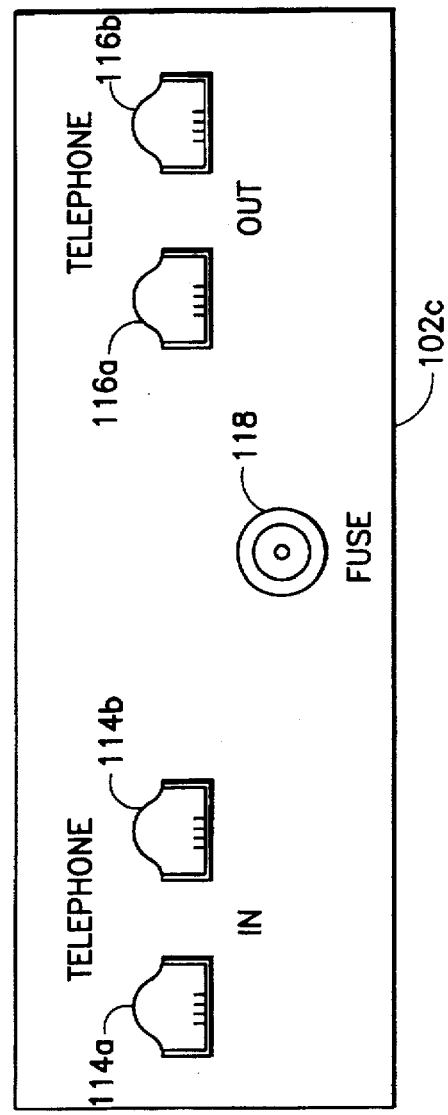
FIG. 4B is a rear elevational view of the back wall or panel of the controller housing shown in FIG. 4A.

Referring now specifically to the drawings, in which identical or similar parts are designated by the same reference numerals throughout, and first referring to FIGS. 4A and 4B, an access controller in accordance with the present invention is generally designated by the reference numeral 100.

The invention will be described, by way of example, in connection with the use of the controller and method of the invention for accessing long distance telephone service from multiple long distance service carriers. In this connection, it is pointed out that long distance telephone companies each have assigned to them a five digit access code which can be used by telephone users to access their particular networks. When the controller and method of the present invention are used in conjunction with other non long distance services it is clear that each of these services will also need to be identified with a preselected or predetermined access code. The controller and method of the present invention select one of these access code of a particular service provider in accordance with an algorithm to be described once a subscriber indicates that the subscriber wishes to use of that service.

In FIGS. 4A and 4B, the controller 100 is includes a housing 102, including a front wall or panel 102a, a top wall or panel 102b and a rear wall or panel 102c. Mounted on the front panel 102a is a default switch 29, an "in use" LED 30 and a "low battery" LED, to be more fully described hereinafter. A plurality of light emitting diodes (LEDs) (not shown) each associated with another long distance telephone carrier may be provided to show which carrier has been selected. Labels may be provided to indicate the available carriers. Thus, label 106a designates The American Telephone & Telegram Company (AT&T). Similarly, LEDs 104b and 104c designate long distance carriers MCI and Sprint 106b and 106c, respectively. Any desired number of carriers or service providers can be accommodated in this fashion, the reference 106n designating the last of these available carriers. In the embodiment illustrated, the controller 100 can accommodate ten such long distance carriers or service providers. A plurality of optional buttons or switches 108a–108n are provided on the top panel 102b, each corresponding to another one of the carriers and LEDs on the front panel 102a. The buttons or switches 108a–108n can be use by a subscriber to manually select a designated long distance carrier or to activate a default condition which corresponds to the subscriber's normal long distance carrier.

An optional display 110 can be used to show the time and/or date, and a display 112 for providing a timer function indicating the length of a long distance call.

Figure 1:
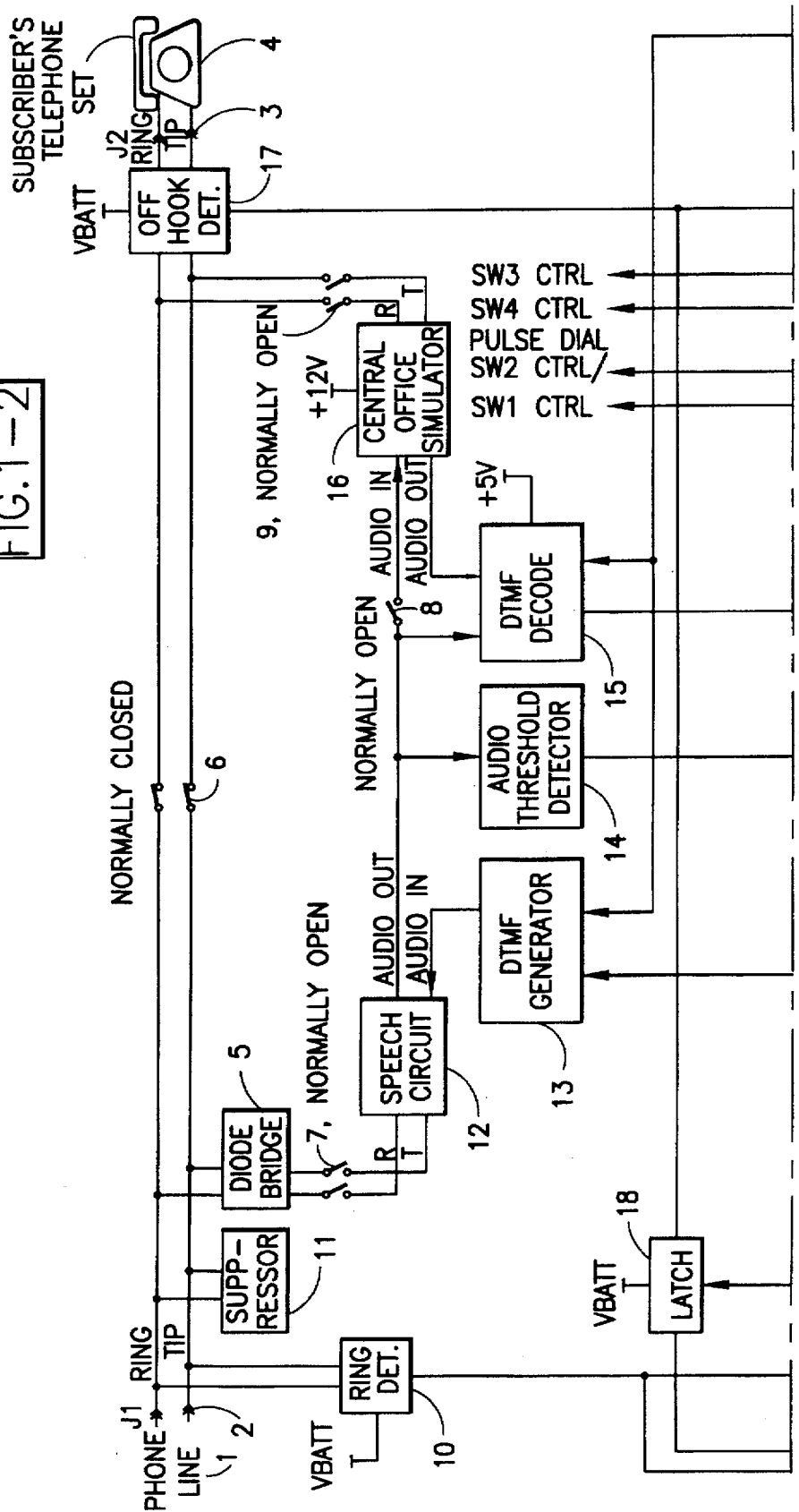
FIG. 1 is a block diagram illustrating the various component parts of a presently preferred embodiment in accordance with the present invention.

On the rear panel 102c, there are shown two telephone modular input jacks 114a, 114b and output jacks 116a, 116b for respectively receiving the external telephone line 114 (FIG. 5) as well as for connecting the controller to a telephone unit or subscriber's telephone handset 4 (FIG. 1). A fuse 118 is advantageously provided for protecting the unit from internal shorts and malfunctions.

Figure 5:
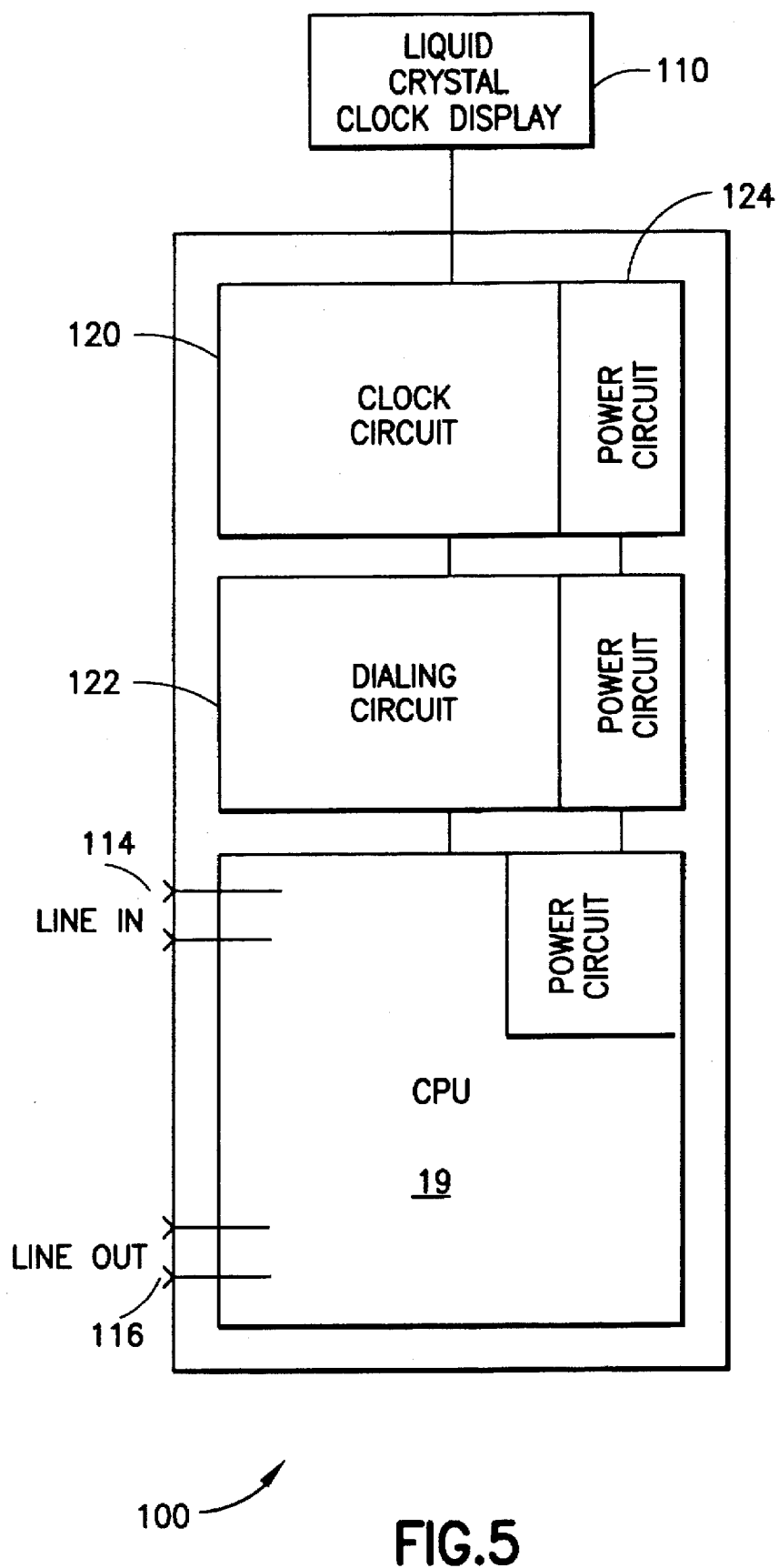

Referring to FIG. 5, a simplified block diagram is illustrated showing the hardware implementation and, specifically, the main building blocks of the controller. The liquid crystal display 110 is connected to a clock circuit 120. A dialing circuit 122, which works in conjunction with the clock circuit 120, is connected to a CPU or microcontroller 19 to which the input telephone lines 114 and output lines 116 are connected. All of the indicated blocks are powered by a suitable power circuit 124. A memory 28 (FIG. 1) is associated with the CPU 19 for storing predetermined access codes each identifying a separate service provider. These access codes are selectively attached to the digits dialed by the telephone subscriber, as a function of a predetermined algorithm, to be more fully discussed below. The clock circuit 120 controls the timing of the circuits within the controller and maintains synchronism between the various components. Preferably, the power circuit 124 is self-powered by its own battery. The controller 100 is programmed to select access codes and attach them to dialed telephone sequences and is preferably programmed to receive and transmit data via a telephone link to allow both modification of the access code data stored in memory as well as the nature of the algorithm used to select the access codes.

A specific embodiment of an access controller 100 in accordance with the invention will now be more specifically described in connection with FIGS. 1, 1A and 1B.

Introduction

The access controller is an electronic device which is placed in series with a subscribers telephone set. When the user dials a long distance number, the access controller inserts a five digit prefix known as the access code into the dialed number. The access code allows the call to be routed through a specific long distance service providers telephone network. Thus, by inserting the access code into the dialed number, the device selects a particular long distance carrier for the duration of the call. Any number of access codes can be stored into the memory list of the access controller, up to ten being provided for in the controller.

The selection of which access code to insert is determined by any algorithm designed such that over a given time period, each long distance company has an equal probability of being selected. Examples of the types of algorithms used to select access codes from the memory list include the following:

(1) A "rotating" algorithm might be used where successive call origination use the next access code stored in the memory list. Once all available access codes have been used, the algorithm "rotates" back to the beginning of the list.

(2) A "time based" algorithm may employ a real time clock to decide when to switch to the next access code in the access code list. The algorithm would be designed such that an access code will not be selected during the same time interval on successive days.

(3) A "random selection" algorithm would select at random one of the access codes stored in the memory list.

The patent for the access controller does not limit itself to the three algorithms described but includes algorithms of all types which provide the stated goal of providing equal access to each of the long distance carriers access codes which are stored into the access controller.

During a non-long distance (local) call, or an incoming call, the access controller remains transparent in that no access code insertion occurs. Additionally, operator assisted calls are also transparent, but this is an implementation feature and is not critical to the design. The access controller works with both tone and pulse dialing type subscriber telephone sets.

The access controller can be reprogrammed via DTMF tones generated by a calling party.

Ring Detector

The ring detector 10 is used to awaken the processor and power up the system during an incoming call. When a ring occurs followed by an off hook condition, the system knows that this is an incoming call and will listen for tones from the programming office. If no tones are received within a timeout interval, the system is powered down.

The ring detector selected for this application is the MC34017 made by Motorola. It provides less than 0.5 REN (Ringer Equivalence Number). Its original design purpose was to drive a piezoelectric finger, but in this application the output will drive an optoisolator. The output of this optoisolator is filtered to remove the warbling tone and is sent to the battery system where it is used to power up the access controller. The optoisolator is chosen for the application is the low cost 4N27.

The transistor output of the optoisolator runs directly from the battery so that ring detection can occur in the powered down state. As shown in the battery life analysis, the leakage current (battery drain) when no ring signal is present is negligible.

Figures 1, 2:
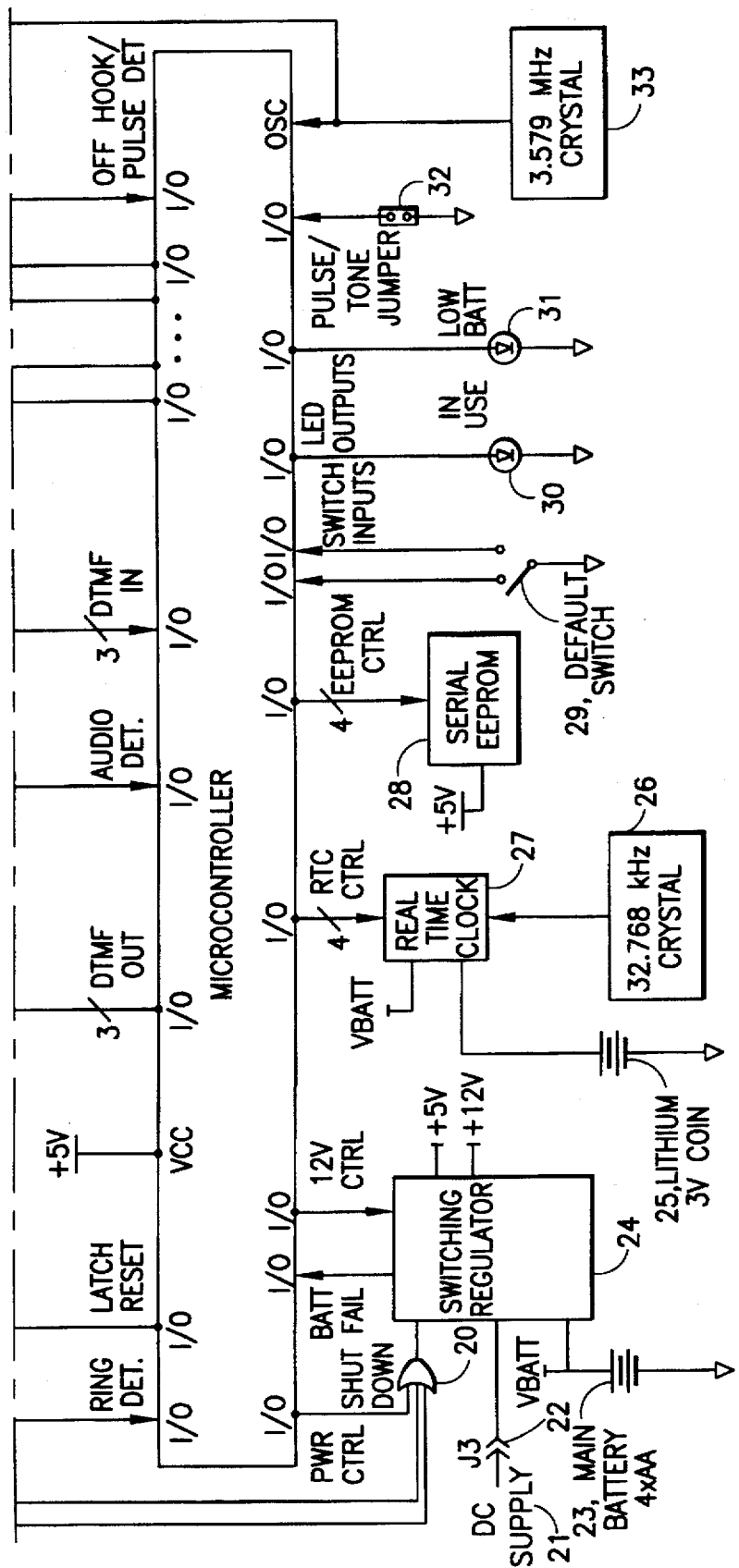
Figure 1A:
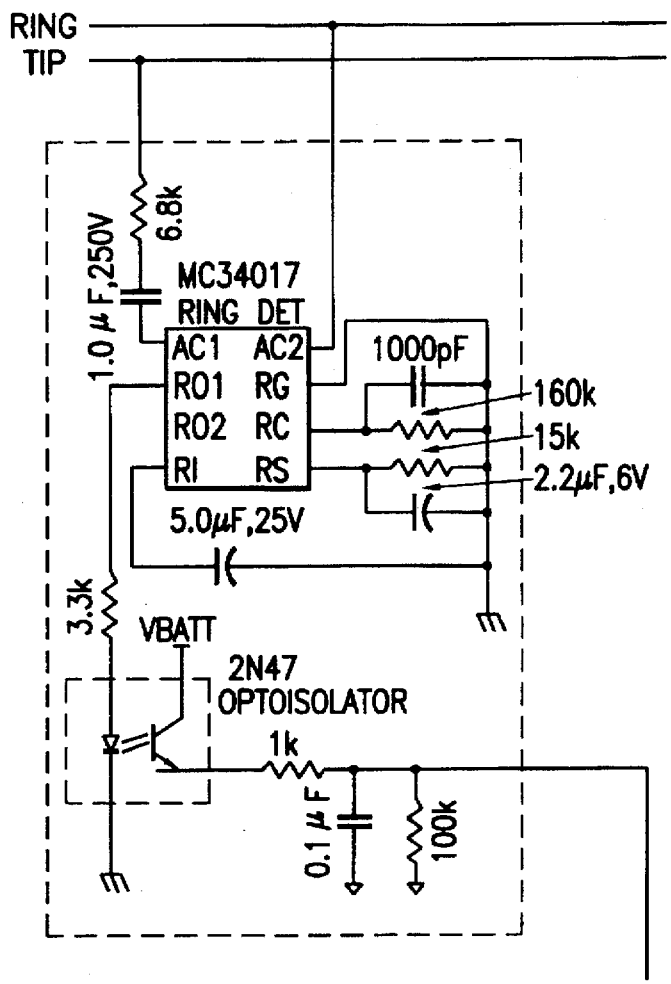
FIG. 1A is a schematic diagram of the ring detector circuit shown in FIG. 1.

The ring detector circuit diagram appears in FIG. 1a.

Off Hook/Pulse Dial Detector and Off Hook Latch

The off hook detector 17 is used to awaken the processor 19 and power up the system when the user goes off hook during a call origination. It is also used during an incoming call to determine when the user has picked up the handset.

The off hook detector 17 selected for this application is the TS117 current detector made by CP Clare. This device was designed specifically for the telecommunications industry and also incorporates an OptoMos switch. Essentially, the off hook detector 17 is an optocoupler with two LEDs for detecting current in either direction. This bi-directional capability is necessary to ensure operation should tip and ring become reverse prior to arriving at the subscribers premises. The LEDs are specially designed to handle the wide range of line currents (20 to 120 mA) encountered in telecom applications and feature minimal voltage drop and no need for current limiting resistor.

This device was chosen over mechanical current detection relays due to size and cost considerations.

Note that in addition to detecting the off hook condition, the off hook detector is also used during pulse dialing. For each pulse digit dialed on the users phone, the off hook detector will detect each pulse which comprises the pulse digit dialed. Software in the microcontroller will decode the pulses into digits according to the 10 pulse-per-second rate with 40%/60% make/break ratio. Note that since the pulse dialing decoding is implemented in software, no external device is necessary. Also note that the software could be changed at a future date to accept the pulse rates and make/break ratios used in other countries.

The output of the off hook detector 17 drives the off hook latch 18. This latch is necessary to allow the system to be powered down while the user is still off hook. This situation occurs after access code insertion has taken place and the users are in the conversation state. Rather than leaving the system powered for the duration of a long winded conversation, the latch allows the system to be powered down while the subscriber is still off hook.

The device chosen for the off hook latch 18 is the widely available 74HC74 device. This device is a dual D Flip-Flop with separate Set and Reset controls. It was selected due to its low price and ability to be operated down to a minimum of a 2 V supply.

The off hook detector 17 and the latch 18 are both powered directly from the battery so that off hook detection can occur in the powered down state. As shown in the battery life analysis, the power consumption of the off hook detector and the off hook latch are negligible.

Diode Bridge and Transient Suppressor

The diode bridge 5 is used to ensure the correct voltage polarity for the speech circuit and DTMF generator, regardless of tip and ring polarity. It is implemented in the standard way using a full wave rectifier which employs four diodes. A 12 V zener diode provides the necessary over voltage protection for the speech circuit and other phone powered circuits.

The rectifier is located in series with the speech circuit rather than in series with the users telephone. If connected as the later, the rectification prior to the users phone would also rectify the ringing signal, essentially doubling the frequency. This would make the system incompatible with party line systems which rely on ring frequency to delineate between different party line subscribers.

The placement of the bridge in series with the speech circuit is made possible by the fact that switch #1 and switch #3 are never both closed simultaneously.

The transient suppressor 11 is the Texas Instruments TISP4180 and is designed specifically for telephone line protection against lightning and transients induced by ac power lines. The device consists of a bi-directional suppressor connected between its two terminals. It will suppress interwire transients. The transients are initially clipped by the zener action until the voltage rises to the breakover level, which causes the device to crowbar. The high crowbar holding current prevents DC latchup as the transient subsides. Rated at a breakover voltage of ±180 Volts, the device is guaranteed not to latch on North American standard ringing voltages (which are typically 90 Vrms, or 126 Vpeak).

Speech Circuit

The speech circuit 12 converts the two-wire phone line to separate audio input and outputs used by the access controller.

This circuit 12 is based upon the Motorola MC34114. This chip is an integrated telephone speech network designed to replace the bulky magnetic hybrid circuit in older style telephone sets. It incorporates the necessary functions of transmit amplification, receive amplification, and sidetone control, each with externally adjustable gain. It also compensates for loop length from the central office by varying the amplifier gains based on loop current. A mute input mutes the microphone and receive amplifiers during dialing. This circuit incorporates an on chip regulator which is used to power the DTMF generator. When applied properly, it can be made to meet all federal regulations and commercial standards for audio level and impedance matching.

This circuit has two audio inputs, one for a microphone and another for a DTMF generator. Only the DTMF input will be used in our application. The audio output of this circuit normally goes to a speaker but in our application, will drive the users telephone set for passing of dial tone. The audio output is also sent to the DTMF decoder so that the access controller can decode reprogramming messages from the programming office.

DTMF Generator

The DTMF tone generator 13 is used during call origination to transmit the access codes. It is also used during reprogramming to send message responses back to the programming office.

The DTMF generator 13 selected for this application is the low cost TCM5089 from Texas Instruments. To reduce battery consumption, this IC will be powered by the phone line via the regulated output from the MC34114. The clock for this IC comes from the DTMF decoder described later.

This IC generates all 16 DTMF tones under control of the processor. The output distortion, tone twist (amplitude delta between high and low tones), and frequency accuracy meet EIA standard RS-470. Detailed design will determine the amount of gain or attenuation necessary to be compatible with the speech chip and ultimately, with the phone line.

Buffering transistors are used to translate the processor outputs to voltage levels compatible with the phone powered device.

The mute output from this chip may be sent directly to the speech circuit. Or, a microprocessor control line may be used as the mute control instead.

Audio Threshold Detector

After the system inserts access codes and dialing by the user had been completed, the audio threshold detector 14 is used to detect the ringback tone from the central office. When ringback occurs, all circuitry is disconnected and a direct connection is made between the phone line and the users handset.

The audio detector 14 is based on the NJM2072 chip from New Japan Radio. This IC was chosen because it provides a lower cost solution over a true ringback tone detector. It features sensitivity of −36 dBV (45 mV p-p) which can be scaled to the ringback requirement of TBD mV using a single resistor. The attack time is essentially fixed at 1 mS, and may have to be lengthened using external components depending on future design. The recovery time will be set by a single external 0.22 uF capacitor to approximately 400 mS.

This single IC approach was deemed a lower cost solution than a custom circuit requiring individual op amps, diodes, resistors, and capacitors.

The possibility exists that the audio threshold detector could be deleted from the design. Presently, the ringback tone to the Audio Threshold Detector is used to inform the access controller that the user is finished dialing digits so that the system can be powered down to save battery life. Other methods of determining when the dialing is completed may be possible.

DTMF Decoder and 3.579 MHz Crystal

The DTMF decoder 15 is used to decode the digits dialed by the user during call origination. It also decodes the message characters sent by the reprogramming office during a reprogramming call.

The device selected for the application is the Harris CD22202. This IC is pin-for-pin compatible with the popular SSI 75T202 and is capable of detecting all 16 DTMF digits. This decoder requires no front-end filtering. On the chip, the analog input is preprocessed by a 60 Hz reject filter and by bandsplitting filters. The result is then hard limited and sent to eight bandpass filters to detect the individual tones. A digital post processor then times the tones and provides the correctly coded digital outputs. The input sensitivity is −32 to −2 dBm. Further design will determine if any gain or attenuation is necessary to be compatible with the other analog circuitry.

A 3.58 MHz crystal generates the time base for this IC as well as for the processor and the phone powered DTMF generator. Using one crystal to perform "triple duty" eliminates the need for multiple crystals, presenting a cost savings.

Given a lifetime of 10 years, the sum of the crystal frequency inaccuracies are 850 ppm which is equivalent to 3042 Hz. This translates to 0.085%. The accuracy spec according to EIA RS-470 standards for DTMF tones is 1.5% for generation and 2% for detection which is well within the crystals tolerances.

Central Office Simulator

Figure 1B:
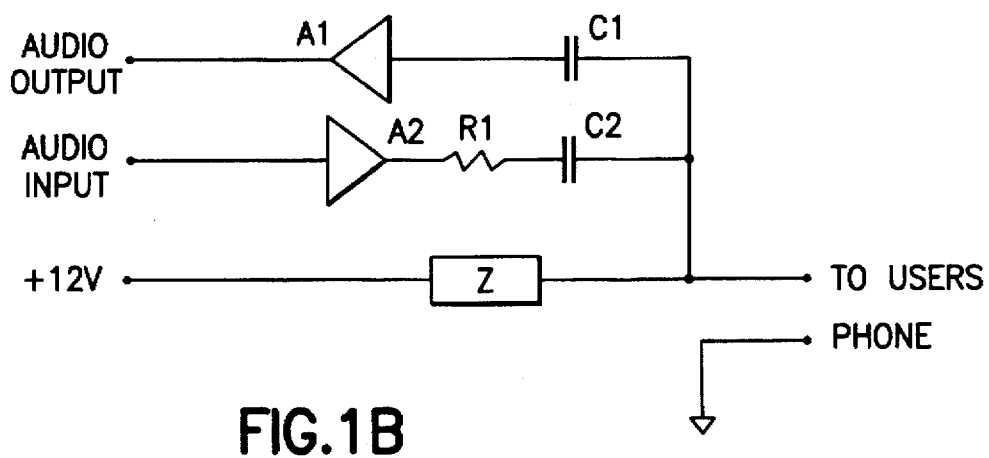
FIG. 1B illustrates a circuit for the central office simulator shown in FIG. 1.

As shown in FIG. 1b, the central office Simulator 16 is actually a very simple circuit which provides power and audio to the phone during a call origination. Basically it is an impedance in series between the +12 V supply and the users phone. Audio is injected and derived from the circuit node which joins the phone and series impedance.

The series impedance is chosen to provide 30 mA of current to a "standard" phone. Since there is no such thing as a "standard" phone this impedance may be implemented using a varistor in an attempt to provide some measure of consistency.

Rather than using a separate supply from the battery system, another design approach which eliminates the need for the 12 V supply is possible. Conceptually, the users phone could be powered by the incoming phone line. It would be necessary to heavily filter the DC from the incoming phone line so that audio generated by the speech circuit would not be heard in the users handset. Rather than passively filtering the DC power, a three terminal adjustable voltage regulator could be used with the same effect, the downside being the inherent voltage drop across the regulator.

It may also be feasible to eliminate the 12 V supply. Some considerations include rural areas which have long lines from the central office to the users premise, coupled with the possibility of several phones already being connected to the single phone line. Eliminating the 12 V supply dictates that the access controller essentially presents two loads to the line, one being the speech circuit and the other being the users phone.

Switches

During various stages of call processing it is necessary to connect and disconnect different portions of the circuit. This switching function is accomplished using OptoMos™ switches 6–9. Created for the telecommunications industry, these devices allow solid state switching of almost any voltage level using a highly isolated low voltage control signal. Basically, the control signal turns on an LED which shines light on a photo voltaic (solar) cell. The output of the solar cell is used to bias a MOSFET into conduction. The source and drain terminals of the MOSFET function as the switch terminals.

These devices provide a better solution than mechanical switches due to their small size, low power control signal (saves battery life), and higher reliability. Although somewhat expensive, on a per-switch basis, they remain less costly than relays.

Two OptoMos™ devices manufactured by CP Clare are employed. The TS117 features a normally open switch and a current detector (which is used for the off hook detector). The LDA110 features two switches, one normally open and the other normally closed.

Of special interest is switch 7. This switch performs a dual function. In addition to its normal function of connecting the incoming phone line to the access controller, it is also used for pulse dialing. This is made possible by the fact that when switch 7 is closed (and switch 6 is open), opening and closing switch 7 inserts and removes the speech circuit. The speech circuit is designed to present a normal telephone impedance to the incoming phone line. Opening and closing switch 7 removes and inserts this impedance which is equivalent to the on-hook, off-hook conditions used for pulse dialing. This approach to pulse dialing is the approach recommended by the manufacturer of the speech circuit (Motorola) and has been successfully implemented on millions of telephones. As opposed to other approaches which directly short tip to ring, the clever dual use of switch 7 saves recurring parts cost because no additional switch is necessary.

It may be possible to replace some of the OptoMos™ switches with lower cost transistor switches. It is presently believed that switch 7 and 8 are very good candidates for replacement, and switch 9 is a good candidate. Switch 8 will very likely remain an OptoMos type switch.

Real Time Clock; Lithium Battery; and 32.768 kHz Crystal

The real-time-clock circuit 27 is used to keep track of time and is necessary to implement the One Year Expiration feature.

The real time clock circuit 27 could also be used by the optional time-based access code selection algorithm.

The clock circuit 27 chosen for this application is the NJU6355 made by New Japan Radio. It features ultra low operating current which allows years of operation from a lithium battery 25. The serial control from the microprocessor 19 allows for reading and writing of time parameters: Seconds, Minutes, Hours, Day of Week, Day, Month, and Year.

The 32.768 kHz "watch" crystal 26 has a tolerance of 100 ppm at room temperature, meaning that after one million seconds, the clock will be off by 100 seconds. Translated to something we can relate to, after one year, the clock will drift 52 minutes worst case. If a slightly more expensive 20 ppm crystal were selected (and if the ambient temperature remained at approximately room temperature) the drift is expected to be 10.4 minutes after one year. The 100 ppm crystal is deemed acceptable for this application.

The design calls for a 3 V lithium battery. This battery keeps the clock circuit alive during periods of shipment, storage, and during the replacement of the main batteries. When the main batteries are installed, the lithium battery is not used, thus extending its life.

The battery 25 selected is the CR2032, a 20 mm lithium coin cell, having 180 mAHr capacity. This coin cell is expected to power the clock for a minimum of 2.7 years (with 5 years being the expected typical life). Shelf life is extremely long, with the capacity deteriorating only 0.5% annually. A battery holder is used to mount the battery to the PCB. To save board space, the lithium battery will probably be mounted on the bottom side of the PCB.

The real time clock circuit 27 is currently only used for only for the One Year Expiration feature. This feature automatically turns off the access code insertion when the expiration date is passed, essentially rendering the device useless for the purpose of long distance carrier selections. It seems that the real time clock and lithium battery could be eliminated. Instead of having the device expire automatically, a reprogramming call from the programming office could be used to disable the device. This would allow removing several components from the design, and reduces the recurring costs of the access controller. If the option is exercised, the real time clock would be used for the time-based access code insertion algorithm. If the clock circuit were removed, this algorithm would not be possible.

Serial EEPROM

The serial EEPROM 28 is used to store all access codes, plus other device parameters. If the autodialing option is exercised, it will also store autodial numbers. EEPROM technology allows data to be retained even after power has been completely removed from the circuit.

The EEPROM selected for the application is the Microchip 93LC46 which allows 128 bytes of storage with a data retention of more than 40 years. The microcontroller reads and writes to this device using a 3 wire interface (plus one chip select signal).

A separate EEPROM chip was determined to be a less expensive approach over using a microcontroller which included EEPROM built into the microcontroller.

Microcontroller

The microcontroller 19 is the heart of the access controller. During a call origination, the microcontroller receives digits dialed by the user, inserts the access codes according to the selection algorithm, and transmits the access codes via the DTMF generator. During an incoming call, it listens for the reprogramming password and updates device parameters in the serial EEPROM as necessary. A more detailed description of microcontroller function will be given with relation to the software flow charts and call processing discussion.

The microcontroller selected for the access controller is Motorola's MC68HC05C4A. This 8 bit processor has 4 Kbytes internal memory storage for the software program plus 176 bytes of RAM. The 31 I/O pins control all circuit functions. During low volume and prototype builds the one-time-programmable (OTP) version, MC68HC705C4A will be used. For production runs exceeding 2500 units, it is more cost effective to use the metal mask version.

The clock for the microcontroller will be the 3.759 MHz crystal which is also used by the DTMF generator and DTMF decoder. Having this crystal perform "triple duty" reduces parts count and saves product cost.

Switching Regulator; Main Batteries; Or Gate; and External DC Supply

The battery system consists of the switching regulator 24, the main batteries 23, and the external DC supply 21, 22.

The switching regulator 24 takes the input power from the main battery 23 and steps it up to regulated +5 V and +12 V supplies. The +5 V supply output is controlled by the ring detector 10, off hook detector 17, and microcontroller 19. The Access Controller will be off when the user is on hook, essentially drawing no power from the batteries. When the user goes off hook (as during a call origination) or when the phone rings (during an incoming call), the switching regulator 24 5 V output is turned on which awakens the microcontroller 19 and powers up the system. The power control line from the processor 19 ensures that power remains on once ringing stops, and allows power to be turned off while the user is still off hook during the conversation state. The 12 V output is under control of the processor 19 and is only turned on to power the user's phone.

The switching regulator 24 selected is the MAX720 from Maxim. It provides all DC-to-DC conversion and power regulation functions with a minimum of external components. Power conversion efficiency for the 5 V and 12 V supplies are expected to be around 85% and 70% respectively.

Regarding the OR gate 20, the output of the off hook latch 18, the ring detector 10, and the microcontroller's PWR CTRL line are logically OR'D together at the OR gate 20. Asserting any of these signals will turn on power to the system by deasserting the SHUTDOWN control on the switching regulator. This OR gate 20 will likely be implemented using discrete diodes in a "diode-or" configuration.

The main battery 23 consists of 4 AA alkaline cells wired in series. The enclosure selected for the prototype provides for battery storage.

The MAX720 also has the capability to accept an external DC supply. When this supply is present, no power will be drawn from the main batteries. The external DC supply may be unregulated, with an output between 7 V and 20 V.

Estimated Battery Life

Battery life is directly proportional to the number of incoming calls and outgoing calls which occur in one day. When four AA alkaline cells are used the expected battery life is a bit less than 4 months, assuming ten incoming and ten outgoing calls a day. Additionally, switching regulator efficiency 24 and power consumption of all the circuits also affect battery life. Also note that the duration of the call does not affect battery life because the processor automatically switches off the power after access code insertion has taken place which is expected to be 30 seconds nominally. This ensures that long conversations do not unnecessarily drain the batteries.

Rather than using 4 AA cells, the enclosure chosen for the prototype could accept 2 C cells, resulting in an estimated battery life of 6 months. If 3 C cells are used the battery life increases to about 9 months.

The lithium coin cell used as backup power for the real-time-clock circuit has a lifetime of 2.7 years minimum with 5 years or more being a typical lifetime. Note that the clock circuit is also powered by the main battery. Each day which the unit is operated from the main battery adds a day to the life of the lithium cell.

Default Switch; LED Indicators; and Pulse/Tone Selection Jumper

A selector switch 29 on the front panel is included which allows the user to always use the default carrier if desired. The switch is labeled "Normal" and "Default" to signify normal operation and default carrier. Since "normal" and "default" may mean the exact same thing to some people, other labels can be used, such as "normal" and "backup" or "default" and "automatic", etc.

thus, one switch position allows for normal or automatic access code insertion according to the algorithms described previously. The other switch position instructs the Access Controller to always use the default carrier.

An "In Use" LED is included. This LED 30 will preferably be green and will flash 3 times during access code insertion. This provides a feedback to the user that the device is working.

A "Low Batt" LED 31 is also included. This LED will preferably be red and, when the battery is low, it will flash continuously for 20 seconds on each outgoing or incoming call.

The "Pulse/Tone" jumper 32 can be a small two pin jumper identical to the type used in electronic equipment. The state of this jumper will be read by the processor during power up initialization to determine if the access controller should listen for DTMF (tone) or pulse dialing.

Operation

Figures 1, 2A:
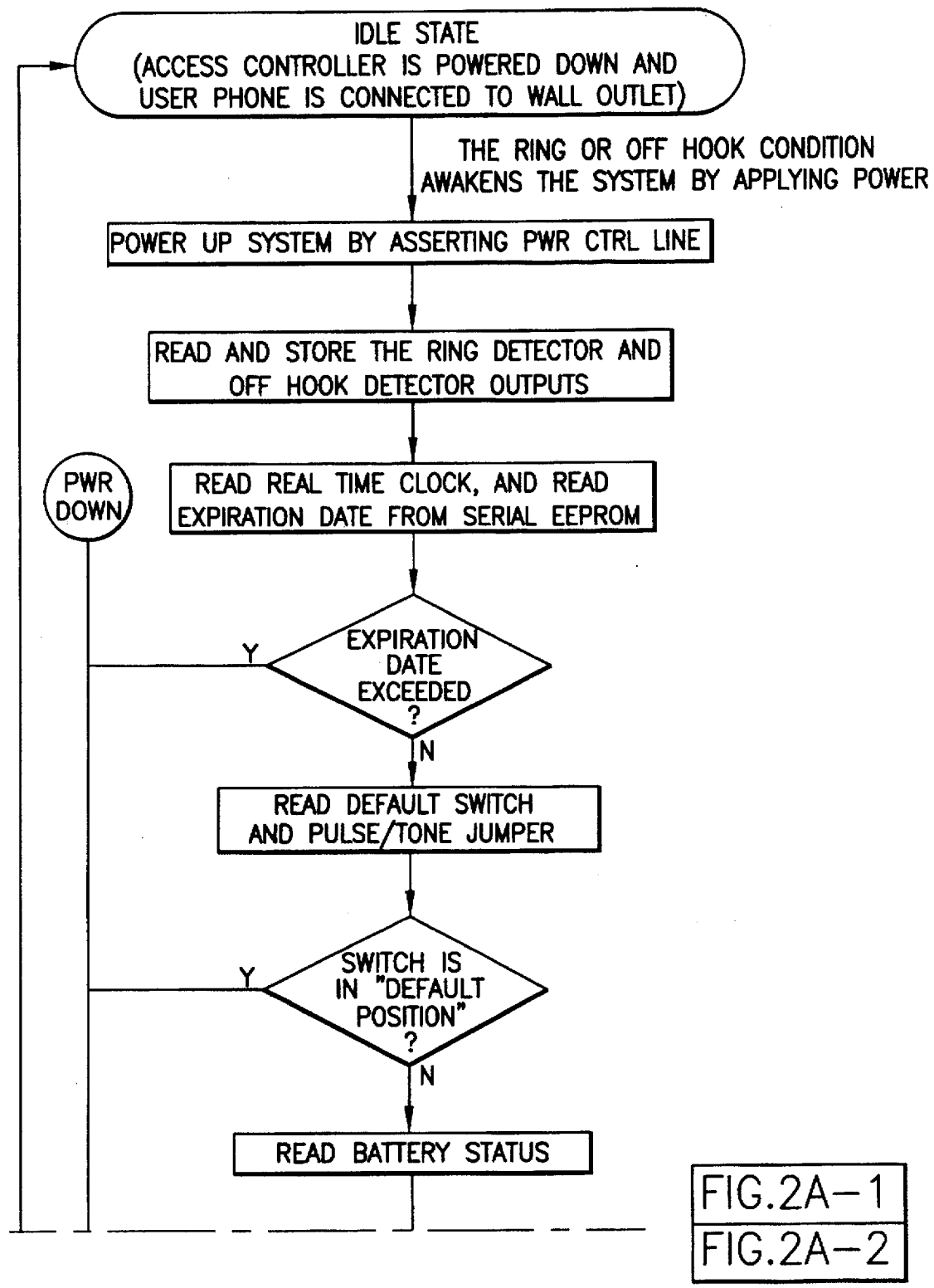
FIGS. 2A–2C are flow charts illustrating power up/down sequences, call origination/access code insertion, and incoming call/re-programming sequences.
Figures 2, 2A:
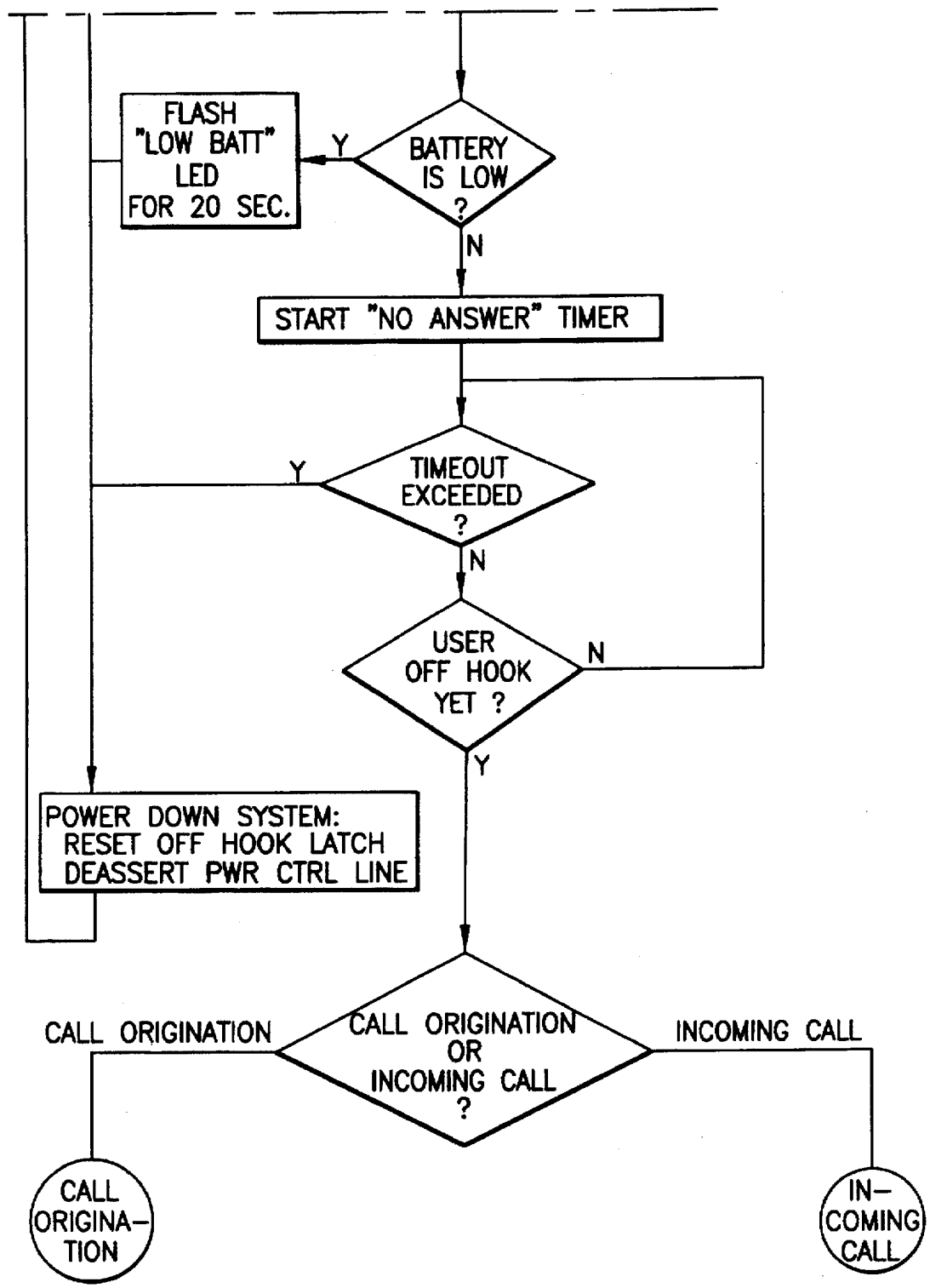
Figures 2, 2B:
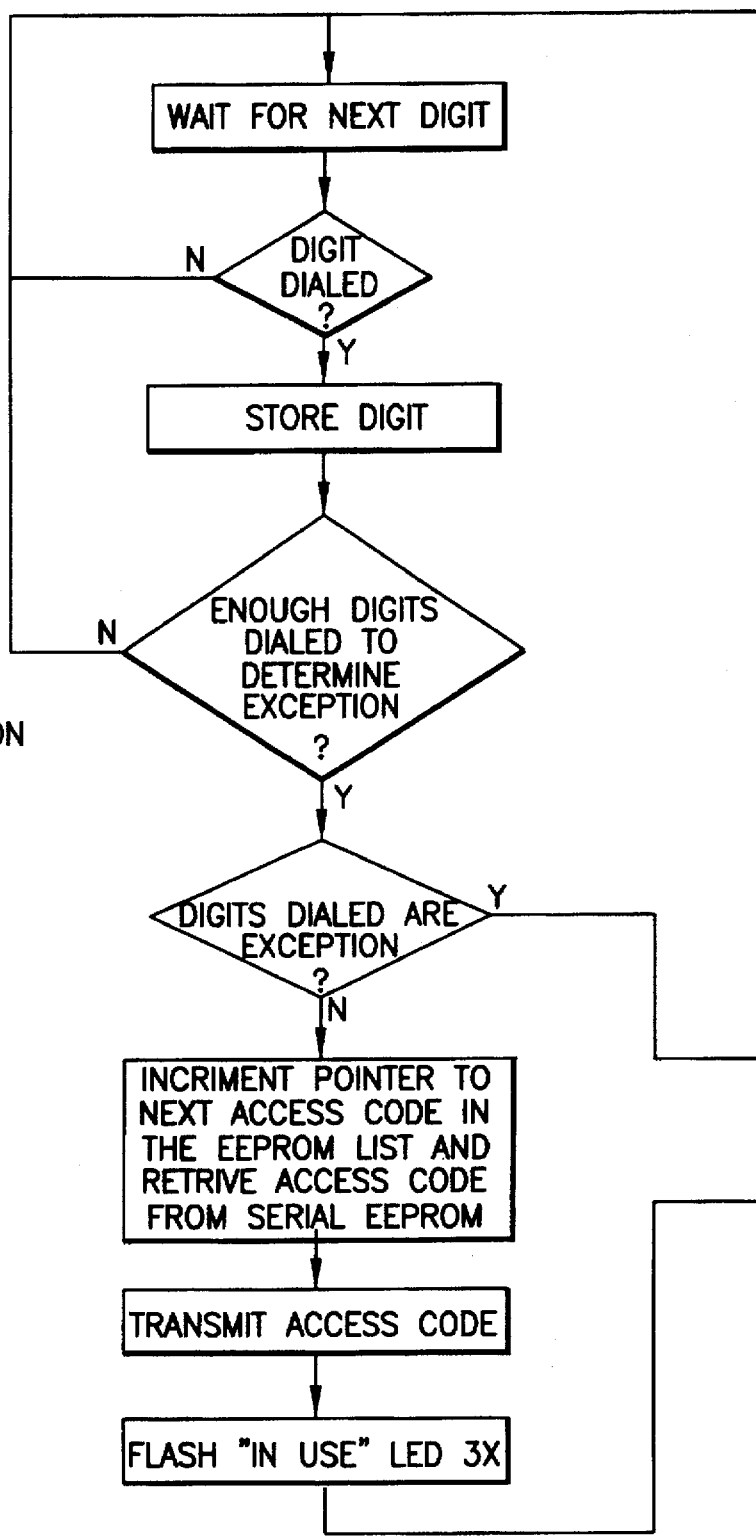
Figure 2C:
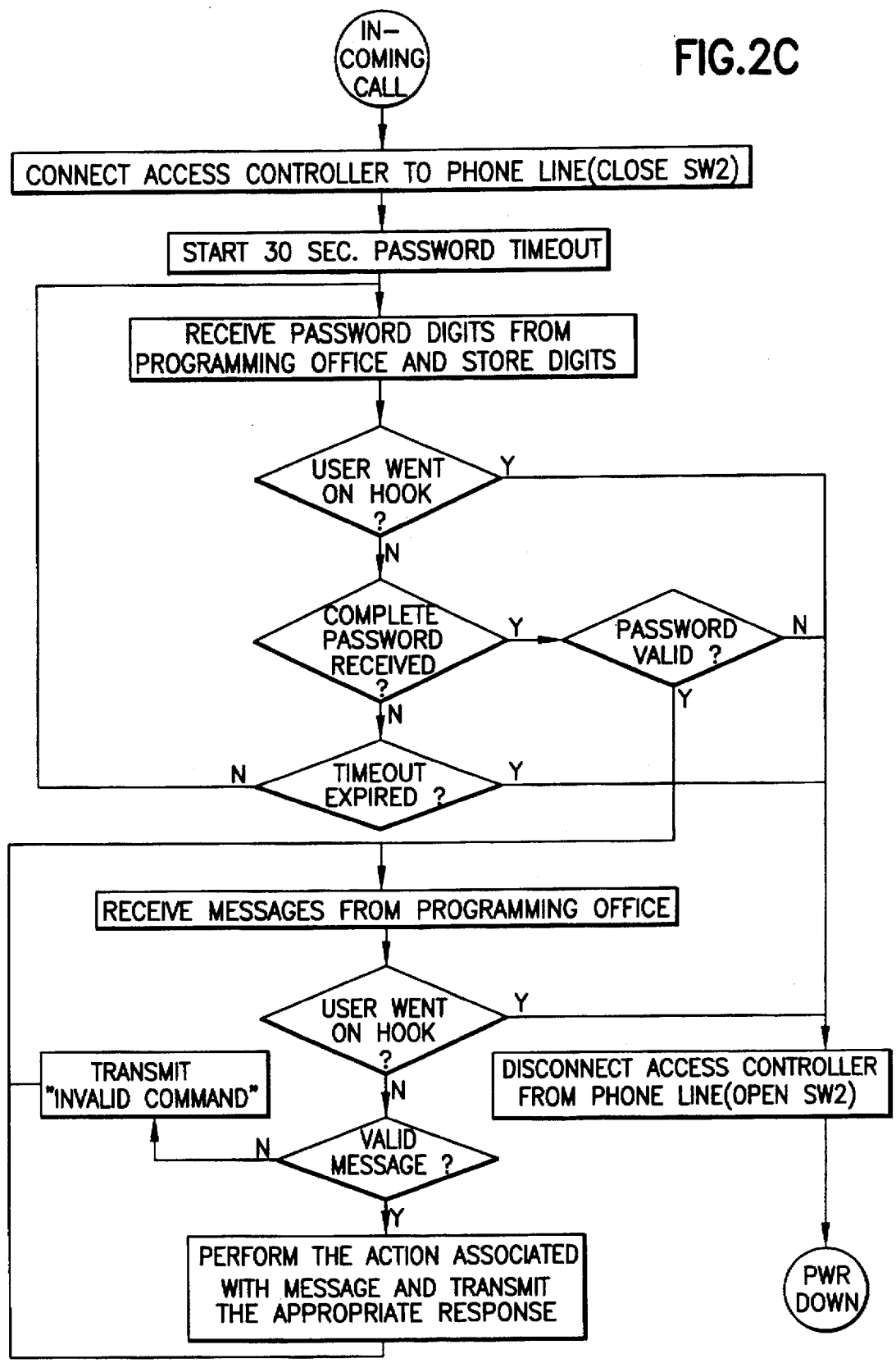

Referring now specifically to FIGS. 2A to 2C, the sequences of events which occur during all stages of call processing for the access controller will be described, including Power Up/Down Sequence, Call Origination/Access Code Insertion, and Incoming Call/Reprogramming Sequence.

Power Up/Down Sequences

Powering Up

When an incoming call occurs, the ring detector 10 will sense the ringing condition. Likewise, when the user goes off hook during an outgoing call, the off hook detector 17 will sense this condition. The off hook condition is latched by the off hook latch 18. The outputs of the off hook latch 18, the ring detector 10, and the microcontroller 19 PWR CTRL line are logically OR'D together at the OR gate 20. Asserting any of these signals will turn on power to the system by deasserting the SHUTDOWN control on the switching regulator 24. This OR gate 20 can be implemented using discrete diodes in a "diode-or" configuration. When the switching regulator 24 is turned on, the +5 V is applied to the microcontroller 19. The microprocessor 19 requires approximately 5 mS to power up, most of that time being required to stabilize the microcontroller's crystal. Once powered on, the microcontroller 19 will immediately assert the PWR CTRL signal which insures that the switching regulator 24 will remain on. Once powered on, the state of the RING DET and OFF HOOK/PULSE DET signals will be read and stored by the microcontroller 19. This information will be used later to determining if the power up sequence occurred due to a ring condition (incoming call) or an off hook condition (outgoing call). Note that any voltage transients present on the phone line will be suppressed by the transient suppressor 10.

U.S. ring signals are typically 2 seconds on 4 seconds off. It is quite reasonable to assume that the ringing will last long enough (at least 5 mS) to allow the microcontroller 19 time to power up and read the state of the ring detector 10.

Once the system has been powered up, the date from the real-time-clock 27 will be read via the RTC CTRL lines and stored by the microcontroller 19. The real-time-clock 27 is normally powered from the main battery 23 and is also powered by a 3 Volt lithium coin cell 23 during periods when no main battery is installed (such as during shipping of the device and during the replacement of the main battery).

After reading the real-time-clock 27, the microcontroller 19 then reads the expiration date stored in the serial EEPROM 28 via the EEPROM CTRL lines from the processor. If "today's date" from the real-time-clock 27 exceeds the expiration date, the system is powered down, preventing any access codes from being inserted.

Similarly, the state of the user switches are read. The "default" switch 29 is read via the processor SWITCH INPUT lines to determine if the switch is in the "default" position. If so, the system will be powered down preventing any access code insertions, and resulting in every outgoing call will use the subscriber's normal (default) long distance carrier.

The state of the tone/pulse jumper 32 is also read. The state is stored in memory for future use by the software.

Next, the status of the batteries is determined. The switching regulator 24 contains a BATT FAIL output which can be read by the microcontroller 19. If the batteries are low, then good engineering judgment dictates that no attempt is made to use the access controller circuitry. Instead, the "Low Batt" LED is flashed for 20 seconds to prompt the user to change the batteries. The system is then powered down so that all calls will use the default carrier.

It is quite possible that the power on sequence occurred due to an incoming call and that no user is home to answer the phone. For this reason, the microcontroller 19 will set a "No Answer" timeout expected to be 20 seconds. If no off hook condition occurs within the timeout interval, then the system is powered down. Note that if the power on sequence occurs due to an outgoing call, then the user will already be off hook which guarantees that the time out will not expire.

The timeout duration is an engineering tradeoff between battery life and the programming office inconvenience. The timeout interval is necessary only during an incoming call where ringing occurs. During every incoming call, the access controller does not know who placed the call, that is, it might be the programming office attempting to reprogram the device. For this reason it is necessary to power up and listen for reprogramming password on every incoming call. Powering up for unnecessarily long times consumes battery power. Thus as short of a timeout interval as possible should be used. The tradeoff here is that if the programming office does in fact wish to reprogram the device, is 20 seconds a long enough time to allow the user to answer and the password to be sent? Perhaps not. Perhaps a better approach to reprogramming would be to place two calls. One the first call, the programming office would speak to the user and explain that they wish to update the access controller and that they would be calling back momentarily to reprogram the device. Both parties would then hang up and the programming office would immediately call back. On this second call the password would be set and the reprogramming would take place. In this case the timeout interval could be shortened (because the customer would be on hand to quickly answer the phone on the second call), thus saving battery life. The method used will depend on an assessment of the variables for a given situation.

Assuming the normal case where expiration date was not exceeded, the switch 29 is not in the "default" position, the battery is not dead, and the timeout interval is not exceeded, then the system must determine if the power up sequence occurred due to an incoming call or an outgoing call (call origination). This decision is made by simply looking at the ring detector status: if no ring was previously detected (as determined by the previously stored RING DET status) then it is a call origination, otherwise it is an outgoing call.

Powering Down

If any of the expiration date, switch position, battery status, or timeout tests should fail, then the system should be powered down and placed in the idle state. To power down the system, the microcontroller 19 must clear the off hook latch 18 by toggling the LATCH RESET line, and deassert the PWR CTRL signal. Note that the latch 18 for the off hook detector allows the system to be powered down while the user is still off hook. This is desirable so that battery power can be saved while the user is involved in a conversation.

Call Origination/Access Code Insertion

Once the system has been powered up and it has been determined that a call origination (outgoing call) is in progress, it is necessary for the access controller to totally disconnect the users phone from the phone line and switch in the access controller circuitry so that the access controller can listen for dialed digits without those digits actually being sent to the central office. Once switched in, the access controller must inspect the digits dialed by the user to determine if the outgoing call is a long distance call, and if so, whether the access code should be inserted or not.

Switching in the Access Controller

Referring to the FIG. 1 block diagram and the FIG. 2 flow charts, to disconnect the user's phone from the central office, and to insert the access controller in its place, the following actions must take place.

First the +12 V supply from the switching regulator 24 must be enabled. This supply is used to power the user's phone once it is disconnected from the phone line. This is accomplished by asserting the 12 V CTRL signal from the microcontroller 19. It may take several milliseconds for the switching regulator 24 to come into full regulation.

The second step is close switch 7 by asserting the SW2 CTRL signal from the microcontroller. This connects the phone line to the access controller and applies power from the diode bridge 5 to the speech circuit 12, DTMF generator 13, and Audio Threshold Detector 14. (The audio threshold detector 14 is currently not used in the implementation of the access controller). The diode bridge 5 is used to provide known voltage polarity regardless of the tip and ring polarity. This is necessary because the tip and ring lines from the phone company may have gotten reversed prior to arriving to the access controller. Once switch 7 is closed, the dial tone from the phone line is available to the speech circuit 12.

Note that during the very short interval of time during which switch 6 and 9 are both closed, the phone line will see two telephone loads; one from the user's phone and the other from the speech circuit 12. This duration is expected to be no more than 5 mS.

The next step is to open switch 6 (using the SW1 CTRL output from the microcontroller). This totally disconnects the user's phone from the phone line. During the very short interval of time in which switch 6 and 9 are both open, the user's phone will be dead. This duration is expected to be approximately 5 mS and is dictated by the time necessary to allow the switches to open and close.

The next step is to close switch 9 (using the SW3 CTRL output from the microcontroller). This connects the access controller to the users phone and reapplies power to the user's phone.

The last step is to close switch 8 (using the SW4 CTRL output from the microcontroller). This passes dial tone from the phone line to the users phone.

The entire time from the detection of off hook, to the connection of the access controller to the users phone and the passing of dial tone is expected to be less than 50 mS. This is quite reasonable because it takes hundreds of milliseconds for the user to pick up a phone and bring it to his ear.

Listening for Digits Dialed/Access Code Insertion

Once the access controller has taken control of both the user's phone and the incoming phone line, it is now necessary to listen to digits dialed by the user to determine if the outgoing call is a long distance call.

The audio from the user's phone passes through the Central Office simulator circuit 16 shown in FIG. 1b. This circuit supplies power from the switching regulator 24 to the user phone and provides for separate audio input and output paths. The audio output is sent to the DTMF Decoder 15.

The access controller first waits for the first digit to be dialed on the user's handset. (Although not explicitly shown in the flow charts, if the previously read pulse/tone jumper 32 was set to pulse, then the software will listen for pulse digits on the OFF HOOK/PULSE DET input. Conversely, if set to tone, the DTMF digits are detected by the DTMF Decoder 15 and the microcontroller 19 reads the digits via the five DTMF IN input signals). Once the first digit is dialed, switch 8 is opened (by deasserting the SW4 CTRL signal from the microcontroller) which removes the dial tone from the user's phone and simulates normal phone line operation. To determine if the outgoing call is a long distance or an operated assistance call, the first digit is inspected to determine if it is a "1" or a "0". Recall that only long distance numbers will potentially have access codes inserted, and that operator assisted calls will never have access codes inserted.

If the first digit dialed is a zero (operator assisted call), or if it is not equal to 1 (local call), then no access code insertion is necessary. This first digit is then immediately transmitted over the phone line, and the access controller is quickly disconnected from both the phone line and the users phone and a direct connection between the phone line and the users phone is established.

Again, although not explicitly shown in the flow charts, pulse or tone dialing is determined by examining the previously stored jumper input. To transmit DTMF digits, the microcontroller 19 asserts the eight DTMF OUT lines to the DTMF generator 13. The audio output from the DTMF Generator 13 passes through the Speech Circuit 12 and is placed onto the phone line 1. To transmit pulse digits, the microcontroller 19 places the pulse waveform on the SW2 CTRL/PULSE output line.

If the first digit dialed was a "one", then the number being dialed is a long distance number. Not all long distance numbers need to get access codes inserted. The following long distance numbers might, for examples, be exceptions. This table of possible exceptions is a preliminary list and may change pending future requirements.

| Table of Exceptions |
|---|
| 1-800- . . . |
| 1-900- . . . |
| 1-976- . . . |
| 1-411- . . . |
| 1-167- . . . |
| 1-0 . . . |

Optionally, the device can be programmed to provide further or other screening of calls.

Referring to the software flow charts, when the first digit dialed is a one, then the access controller must store subsequent digits dialed to determine if it is an exception. This is accomplished by successively storing digits as they are dialed and keeping track of whether enough digits have been dialed so that an exception can be determined. If the digits dialed are one of the exceptions, then no access code is to be inserted. Instead, the digits dialed are retransmitted on the phone line and the access controller is removed from the system.

If the digits dialed are not one of the exceptions, then the access code must be inserted. The insertion of access codes into the long distance number dialed by the user is the primary purpose of the access controller device.

The choice of which access code to insert on any particular call may be determined by a "rotating" algorithm where successive call origination use the next access code stored in the EEPROM memory list. Once all available access codes have been used, the algorithm "rotates" back to the beginning of the list. The stated purpose of the insertion algorithm is to provide equal access to each of the long distance carriers stored in memory. To this end, several other access code insertion algorithms are possible such as a time based algorithm, or a random selection algorithm. The access controller does not preclude other types of access code selection algorithms that may be more complex, based on average rates; percentage of time carrier is "busy", special carrier promotions, etc.

To retrieve the access code from the serial EEPROM 28, the processor 19 exercises the four EEPROM CRTL signals. A pointer variable is also stored in the EEPROM 28 which points to the last access code used. This pointer will be incremented to point to the next access code in the memory list prior to the retrieval of the access code from memory.

Regardless of the algorithm used to select the access code, once obtained, the five digit code will be inserted into the long distance number as explained in the following example: Assume the user dialed the valid long distance number 1-513-276-3325, and the access code retrieved was ABCDE. (Note that the first digit of the access code is always equal to "one" and need not be stored in the EEPROM. The remaining four access code digits, BCDE, are what is actually retrieved from the serial EEPROM 28). The resulting digits dialed to the central office will take the form ABCDE-513- . . . .

The access code insertion occurs as soon as possible during the dialing of the digits by the user. It is not required for the user to dial all digits prior to the having the access controller insert the access code.

Once the access code has been transmitted, the "In Use" LED will flash three times as an indication to the user that the device is operating. The access controller will then be disconnected from the user's phone.

Switching Out the Access Controller

If the outgoing call is an operator assisted or local call, or if the access code has already been inserted, the access controller must be removed from the system.

To disconnect the access controller from the user's phone and to reconnect the user's phone to the phone line, the following actions must take place. First, switch 9 is opened (by deasserting the SW3 CRTL signal from the microcontroller 19) which disconnects the phone from the access controller. During this very short period (approximately 5 mS) the user's phone will be powered down. Next, switch 6 is closed (by deasserting the SW1 CRTL signal from the microcontroller 19). This action connects the user's phone to the incoming phone line, reapplying power to the user's phone. The next step is to open switch 7 (by deasserting the SW2 CRTL signal from the microcontroller) which disconnects the access controller from the incoming phone line. The last step is to turn off the power to the central office simulator circuitry 16 by deasserting the 12 V CTRL signal from the microcontroller 19.

When all of the above steps are accomplished, the phone line is connected directly to the user's phone and the access controller is disconnected. The system is then powered down as described previously.

Incoming Call/Reprogramming Sequence

Once the system has been powered up and it has been determined that an incoming call is in progress, it is possible that the incoming call is from the programming office attempting to reprogram the access controller. For this reason, it is necessary for the access controller to connect itself to the phone line and listen for a reprogramming password. DTMF signaling is used for reprogramming regardless of the TONE/PULSE JUMPER input.

Referring to the software flow charts, to connect the access controller to the phone line during an incoming call, switch 7 is closed (by asserting the SW2 CTRL signal from the microcontroller). During the entire time that switch 7 is closed, the phone line will see two loads, one from the user's phone and the other from the access controller. Next a password time out is started. This timeout requires that the programming office send the password during the timeout interval.

The access controller remains in a loop until the user goes on hook, the timeout expires, or an invalid password was received. If any of these conditions is true then the access controller is disconnected from the phone line (by deasserting the SW2 CTRL signal from the microcontroller) and the system is powered down as described previously.

If a valid password is received then reprogramming is allowed. Here the access controller remains in a loop which accepts messages from the programming office and acts upon those messages. If an invalid or uninterpretable message was received (due to noise on the phone line), an "Invalid Message" response is sent from the access controller to the programming office. If the user goes on hook during the reprogramming sequence, only the last message received will be executed. The on hook condition is read by the processor 19 via the OFF HOOK/PULSE DET microcontroller input.

Although not shown in the flow charts, many messages from the programming office can be established, including reading and setting numerous conditions. These, for example, allow the programming office to read the status and change the values of the following device parameters:

1. Real Time Clock
2. Expiration Date
3. Quantity of Access Codes Stored
4. Access Codes
5. Quantity of Autodial Number Stored
6. Autodial Numbers
7. Password
8. Serial Number Additionally, a message can be sent which instructs the access controller that reprogramming is finished. When this message is received, the access controller is disconnected from the phone line and powered down. After this message is sent and the confirmation response is received, the programming office would go on hook. Since the user has probably placed the phone down on the table (rather than sit and listen to all of the reprogramming tones), the fast-busy from the central office would be heard on the user's phone. This prompts the user to go on hook and completes the reprogramming cycle.

Cellular Phone Implementations

The Access Controller concept can be implemented on cellular phones. As opposed to the land line version where the access controller is placed between the incoming phone line and the users handset, the cellular applications show differing versions of the access controller placed between the cellular base unit (usually mounted in the trunk of the car) and the handset (usually mounted within easy reach of the driver). Note that all descriptions could equally be applied to "bag phones" where the base unit and the handset are in close proximity.

Described below are only some of the possibilities for the cellular application of the access controller. Summarily, the access controller concept can be adapted to any cellular manufacturer's existing interface between the handset and the base unit. The diagrams of FIG. 3 show some of the possibilities and are not intended to preclude any other types of interfaces or limit the scope of applications or arrangements for the access controller.

Analog DTMF Signaling between Handset and Base

Figure 3A:
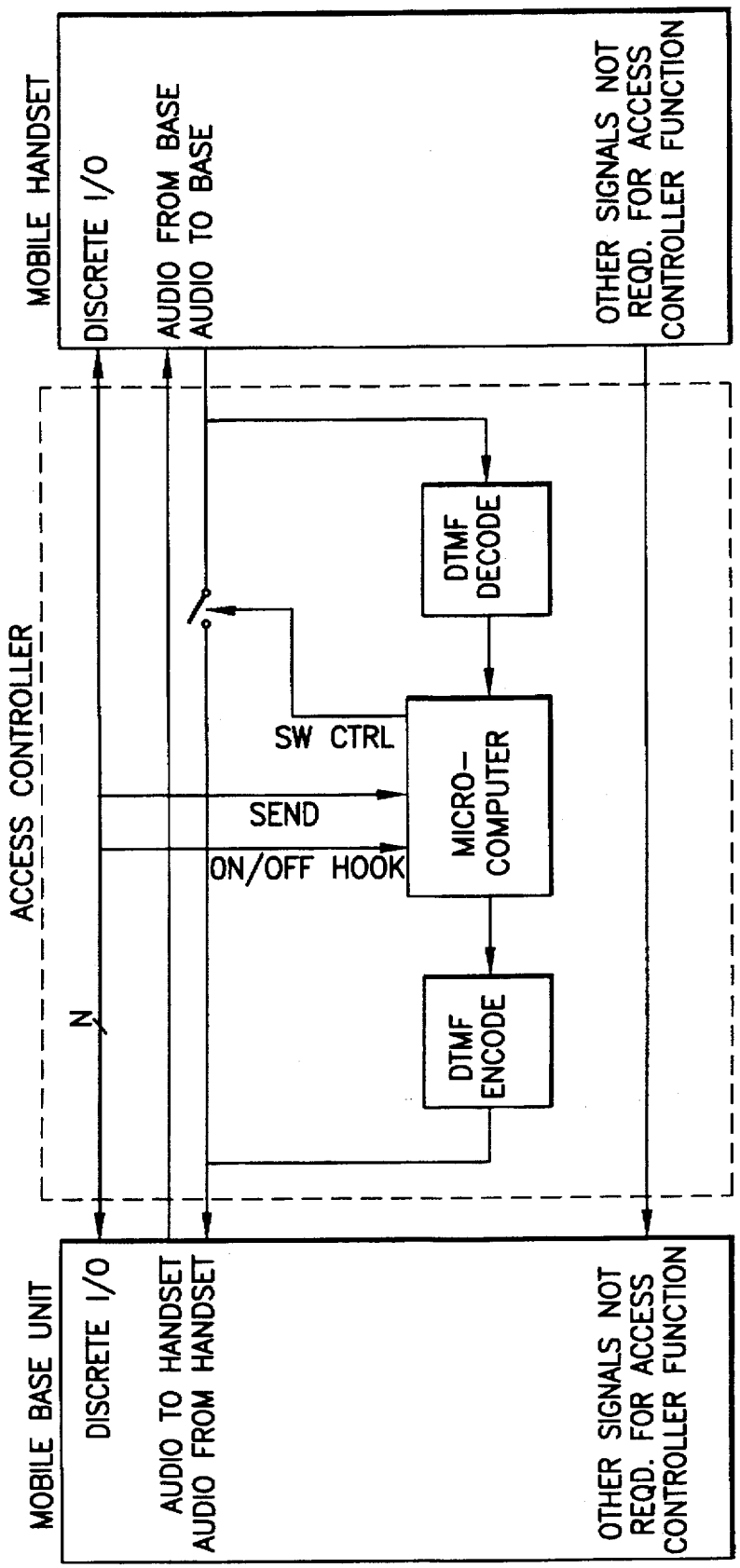
FIGS. 3a–3c are perspective views of the muscle station.

FIG. 3a shows a block diagram of the access controller as applied to a cellular phone which uses analog DTMF signaling between the handset and the base unit.

Here the access controller detects the off hook condition (which is typically implemented by applying power to the handset when it is removed from the cradle) and opens the switch and waits for the "send" button to be pressed. Typically, when the send button is pressed, the DTMF digits being dialed are sent in rapid succession. Here the access controller intercepts the digits and inspects them to decide if the access code needs to be inserted. If so, the access code is chosen and inserted into the dialed number as described previously. If not, the dialed digits are simply retransmitted to the base unit. Once all digits are transmitted, the switch is closed and normal conversation may occur.

Note that the ON/OFF HOOK and SEND signals need not necessarily be implemented as discrete I/O. The access controller could be designed to accept any type electronic input.

The power for the access controller may be derived from the power sent to the user's handset, or a separate battery system (not shown) could be provided.

Discrete I/O Signaling/Parallel Signaling Between Handset and Base

Figure 3B:
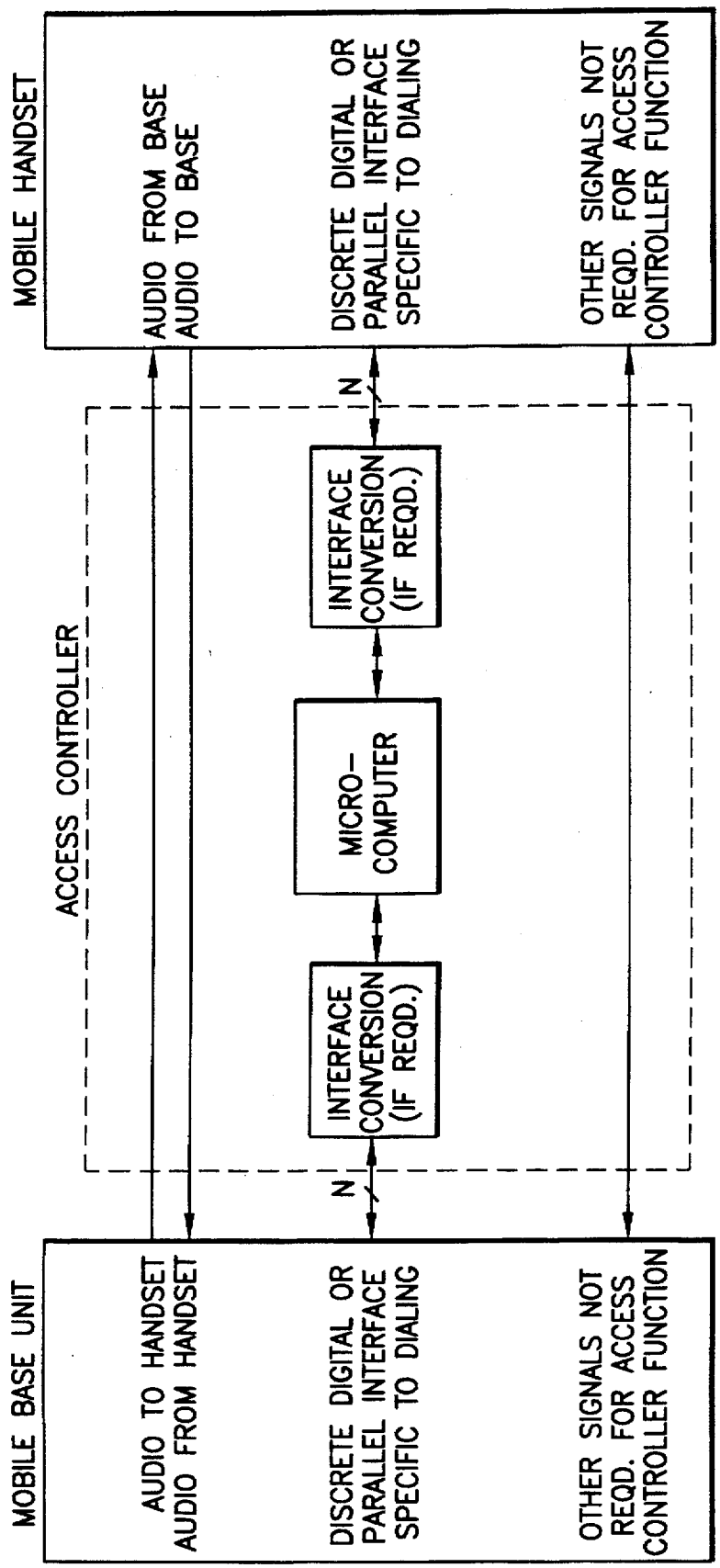

In FIG. 3B the signaling of the dialed numbers is completely separate from the audio to and from the handset, that is, the audio contains no dialing information and carries only voice. In this application, the dialing and other signaling information is performed digitally using discrete I/O lines between the handset and the mobile base.

In this application only those discrete digital signals between the handset and base unit which implement the dialing function are intercepted by the access controller. Here the access controller filters the signals to determine if the signals relate to actual dialing instructions as opposed to miscellaneous housekeeping functions. The dialing instructions are inspected and modified as required to implement the access code insertion feature. All signals not related to dialing function are routed around the access controller or are passed transparently through the access controller. Note that the interface conversion circuits can be eliminated all together provided that the interface between the handset and the base is of a type directly acceptable by the microcontrollers I/O lines.

The power for the access controller may be derived from the power sent to the user's handset, or a separate battery system (not shown) could be provided.

Asynchronous Serial Signaling-or-Three Wire Bus Between Handset and Base

Figure 3C:
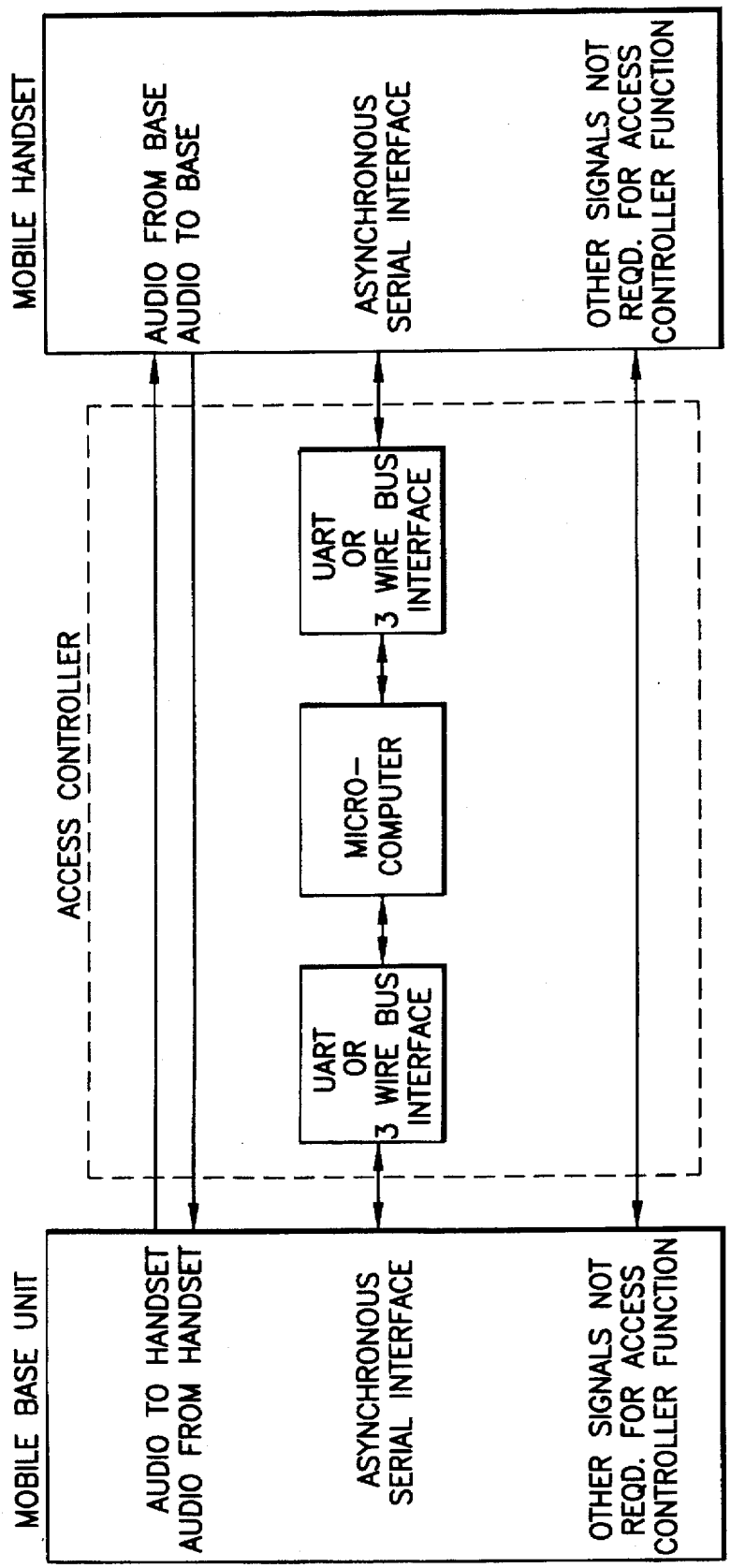

In FIG. 3C the signaling of the dialed numbers is completely separate from the audio to and from the handset, that is, the audio contains no dialing information and carries only voice. In this application, the dialing and other signaling information is performed digitally using asynchronous serial communication (such as RS232) or a three wire bus interface (common for Motorola phones) between the handset and the mobile base.

Typical cellular phones which employ serial communication place every command between the handset and the base on the serial bus. In this application every command between the handset and base unit is intercepted by the access controller which filters the commands to determine if the signals relate to dialing instructions. Any dialing commands are inspected and modified as required to implement the access code insertion feature. All commands not related to dialing instructions are passed transparently through the access controller. A UART (Universal Asynchronous Receiver Transmitter) or Three Wire Bus Interface is required to convert the serial protocol to information compatible with the microprocessors architecture.

The power for the access controller may be derived from the power sent to the users handset, or a separate battery system (not shown) could be provided.

It will be evident, therefore, that the controller and method of the present invention can be used in numerous applications, only two of which have been specifically described, namely long distance telephone and cellular service. It will be clear to those skilled in the art, however, that the access controller and method of the invention can be used to provide access to subscribers of other numerous services where multiple service providers are available.

While this invention has been described in detail with particular reference to a preferred embodiment thereof, it will be understood that variations and modifications will be effected within the spirit and scope of the invention as described herein and as defined in the appended claims. Thus, for example, a diode bridge 5 is used in the preferred embodiment to provide polarity protection for the speed circuit 12. However, if a phone interface is provided which guarantees the tip and ring polarity, the diode bridge can be eliminated. Also, the switches 6–9 have been used in the preferred embodiment to provide switching necessary to implement the invention. However, other approaches, such as current mirrors could eliminate the need for discreet switches of the types disclosed. The ring detector 10, in the preferred embodiment, is used to detect the ringing condition. However, other methods of detecting ringing of an incoming phone line are also possible. The transient suppressor 11 is only used as a precaution in the preferred embodiment and may not be required. Similarly, the DTMF generator is used in the preferred embodiment for generating DTMF tones. However, using a dedicated IC to perform this function may be used and other methods such as direct A/D conversion are also possible. The solution shown in the preferred embodiment, however, represents the expected lowest cost approach. Other methods are likewise possible for determining audio threshold when the user has stopped dialing digits. Therefore, the audio threshold detector 14 may likewise be omitted. Similarly, the serial EEPROM, used to store access codes, may be replaced with, for example, a separate IC. Also, the memory storage can be build into the processor or microcontroller 19. This component may even be eliminated altogether if changing of access codes is not desired and fixed access codes are contemplated. In such a case, a simple ROM memory may be used. Numerous other components may be eliminated or replaced, as will be evident to those skilled in the art. The cell 25, for example, is required to keep the real time clock alive. The real time clock is used in the preferred embodiment to provide additional features and is not necessary for access code insertion. The crystal 26 is required only as a time base for the real time clock. The real time clock 27 is used in the preferred embodiment to provide additional features and is not necessary for access code insertion. For this reason, as well, the real time clock 27 may be omitted in a simplified embodiment of the invention.

We claim:

1. Controller for accessing a predetermined service by a subscriber from one of multiple service providers each identified and selectable by a unique access code, the controller comprising means for monitoring a subscriber unit which serves to initiate the desired service, the controller including means for detecting when the subscriber elects to obtain the predetermined service from one of the service providers; and selection means for selecting one of the multiple service providers by generating a telephone service provider access code corresponding to one of the service providers in accordance with a predetermined algorithm which provides a desired distribution of usage by the subscriber of a plurality of the service providers, which selects a service provider substantially independently of the destination of the call being made, whereby the subscriber will obtain said predetermined service from each of said plurality of service providers with continued use of the controller.

2. Controller as defined in claim 1, wherein said predetermined service is long distance telephone service, and the controller is arranged between the subscriber's telephone set and the telephone lines.

3. Controller as defined in claim 1, wherein said means for detecting includes digit determining means for determining whether a first digit dialed by the subscriber is a "1" and for enabling said selection means for access code insertion when a "1" digit is detected as a first digit of a long distance telephone number dialed by the subscriber.

4. Controller as defined in claim 3, wherein said digit determining means comprises a DTMF decoder.

5. Controller as defined in claim 3, wherein said means for detecting includes means to prevent generation of an access code for a predetermined number of excepted numbers which start with the digit "1".

6. Controller as defined in claim 5, wherein the excepted numbers include telephone numbers which begin with on of the following leading digits: 1-800, 1-900, 1-976 and 1-411.

7. Controller as defined in claim 1, wherein said selection means comprises a microcontroller.

8. Controller as defined in claim 7, wherein said microcontroller is programmed to provide a rotating section algorithm for generating a next access code of a series of access codes stored in a memory list of access codes for each successive use of the service by the subscriber.

9. Controller as defined in claim 7, wherein said microcontroller is programmed to provide a time based selection algorithm for switching between next access codes in a series of access codes stored in a memory as a function elapsed time, whereby access codes are selected based on time intervals during each of which only a predetermined access code is used.

10. Controller as defined in claim 7, wherein said microcontroller is programmed to provide a random selection algorithm for randomly selecting one of the access codes from all said access codes stored in a memory each time the subscriber elects to use said predetermined service.

11. Controller as defined in claim 1, further comprising programming means for remotely programming said selection means for enabling and disabling said selection means.

12. Controller as defined in claim 1, further comprising programming means for remotely programming said selection means for modifying said algorithm.

13. Controller as defined in claim 1, wherein said predetermined service is cellular service and the controller is arranged between a mobile base unit and a mobile handset.

14. Controller as defined in claim 1, further comprising ring detecting means for detecting an incoming telephone call by the controller and for enabling said selection means to be placed into communication with a remote programming unit.

15. Controller as defined in claim 1, further comprising memory means for storing said access codes for selection by said selection means.

16. Controller as defined in claim 15, wherein said memory means comprises an EEPROM.

17. Controller as defined in claim 2, further comprising a speech circuit for interfacing between a telephone line and said selection means.

18. Method for accessing a predetermined service by a subscriber from one of multiple service providers each identified and selectable by a unique access code, the method comprising the steps of monitoring a subscriber unit which serves to initialize the desired service from one of the service providers; and selecting one of the multiple service providers by generating a telephone service provider access code corresponding to one of the service providers in accordance with a predetermined algorithm which provides a desired distribution of usage by the subscriber of a plurality of the service providers, which selects a service provider substantially independently of the destination of the call being made, whereby the subscriber will obtain said predetermined service from each of said plurality of service providers with use of said predetermined service.

19. Method of accessing a predetermined service as described in claim 18, wherein the service providers are rotated to generate a next access code of a series of access codes for each successive use of the service by the subscriber.

20. Method of accessing a predetermined service as described in claim 18, wherein the service providers are switched on the basis of time intervals allocate to each service provider, whereby each access code in a series of access codes are used within an allotted time interval during each of which only a predetermined access code is used.

21. Method of accessing a predetermined service as described in claim 18, wherein the service providers are randomly selected each time the subscriber elects to use said predetermined service.

22. Method of accessing a predetermined service as described in claim 18, wherein the predetermined service is long distance telephone service, and the subscriber is connected to a long distance carrier in accordance with said predetermined algorithm whenever the subscriber makes a long distance call.

* * * * *